United States Patent
Sullivan et al.

(10) Patent No.: US 11,547,135 B2
(45) Date of Patent: Jan. 10, 2023

(54) MITIGATION OF CHRONIC INFANT MALNUTRITION

(71) Applicant: Quintessence Nutraceuticals, LLC, Indianapolis, IN (US)

(72) Inventors: Glenn H. Sullivan, Carmel, IN (US); Guillermo E. Sanchez, Guatemala (GT)

(*) Notice: Subject to any disclaimer, the term of this patent is extended or adjusted under 35 U.S.C. 154(b) by 0 days.

(21) Appl. No.: 16/575,366

(22) Filed: Sep. 18, 2019

(65) Prior Publication Data

US 2020/0008455 A1    Jan. 9, 2020

Related U.S. Application Data

(63) Continuation-in-part of application No. 14/923,666, filed on Oct. 27, 2015, which is a continuation of application No. 13/494,998, filed on Jun. 13, 2012, now Pat. No. 9,192,180, which is a continuation-in-part of application No. 12/882,202, filed on Sep. 15, 2010, now Pat. No. 8,945,642.

(51) Int. Cl.
*A23L 33/15* (2016.01)
*A23D 9/00* (2006.01)

(52) U.S. Cl.
CPC ............... *A23L 33/15* (2016.08); *A23D 9/00* (2013.01); *A23V 2002/00* (2013.01)

(58) Field of Classification Search
CPC  A23L 33/15; A23L 7/115; A23D 9/00; A23V 2002/00
USPC .............................................. 426/2
See application file for complete search history.

(56) References Cited

U.S. PATENT DOCUMENTS

| | | | |
|---|---|---|---|
| 6,303,586 B1 * | 10/2001 | McPeak | A61P 3/10 514/54 |
| 2006/0171993 A1 * | 8/2006 | Barrett-Reis | A23L 33/15 424/439 |

OTHER PUBLICATIONS

Google scholar search history—Feb. 8, 2021 (Year: 2021).*

* cited by examiner

*Primary Examiner* — Hamid R Badr
(74) *Attorney, Agent, or Firm* — McAndrews, Held & Malloy, Ltd.

(57) ABSTRACT

Disclosed are nutraceutical formulations, and methods of using these nutraceutical formulations for the mitigation of chronic malnutrition in an infant, wherein the infant is breast feeding from a lactating mother ingesting one or more of said nutraceutical formulations in accordance with a prescribed regimen.

3 Claims, No Drawings

MITIGATION OF CHRONIC INFANT MALNUTRITION

CROSS-REFERENCE TO RELATED APPLICATIONS

This application is a continuation-in-part of U.S. application Ser. No. 14/923,666, filed Oct. 27, 2015, now pending, which is a continuation of U.S. application Ser. No. 13/494,998, filed Jun. 13, 2012, now U.S. Pat. No. 9,192,180, which is a continuation-in-part of U.S. application Ser. No. 12/882,202, filed Sep. 15, 2010, now U.S. Pat. No. 8,945,642. The entire content of each of the applications mentioned in this paragraph are hereby incorporated by reference in their entirety.

FEDERALLY SPONSORED RESEARCH OR DEVELOPMENT

[Not Applicable]

TECHNICAL FIELD

The present invention relates to methods for the mitigation of chronic infant malnutrition using nutritionally enhanced derivatives (isolate) from Stabilized Rice Bran (SRB) with improved yield characteristics.

BACKGROUND

Chronic infant malnutrition (CIM) is a condition characterized by retardation in an infant's physical and cognitive development, and is commonly associated with extreme poverty conditions and inadequate caloric-proteic intake by both mothers and infants during pregnancy, lactation and the transition into solid food intake.

CIM still affects about 165 million of children under five years of age in low- and middle-income countries around the world. Medical science has documented that eighty percent of an infant's brain develops during intrauterine growth and the first 24 months of life; up to that time any retardation or under development is reversible if an adequate nutrition is provided to the infant. Early intervention during the first 10-12 months appears to be particularly important. The consequences of poor nutrition during this critical life stage are permanent intellectual impairment and physiological weakness, constituting in essence a sentence for a life of marginality, underperformance and food welfare.

There exist a need in the art to provide functional foods that provide sustainable nutrition to undernourished populations worldwide. Among other things, the present disclosure provides for the conversion of rice bran to its highest bioactive isolate derivatives in shelf-stable formulations, and for the nutraceutical formulations that mitigate malnutrition, including chronic infant malnutrition.

SUMMARY OF THE INVENTION

Provided are nutraceuticals and their use for the mitigation of malnutrition, including chronic infant malnutrition.

In one aspect, the disclosure provides nutraceutical formulations, and methods of using these nutraceutical formulations for the mitigation of chronic infant malnutrition, wherein the infant is breast feeding from a lactating mother ingesting one or more of said nutraceutical formulations in accordance with a prescribed regimen.

DETAILED DESCRIPTION

The Examples that follow are intended to be illustrative of the aspects and embodiments described above. Neither the above disclosure nor the Examples below should be viewed as limiting to the scope of the appended claims. One of skill in the art will appreciate that the disclosure is not limited by the particular terminology which is used to describe and illustrate the various aspects of the disclosure.

Disclosed are nutraceutical formulations, including extracts comprising hydrophilic and lipophilic fractions of stabilized rice bran. Also disclosed are methods for using these nutraceutical formulations for the mitigation of malnutrition, including chronic infant malnutrition.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has the following anthropometric values before starting to ingest the nutraceutical formulations: an age of from 12 to 50 years, from 12 to 45 years, from 12 to 40 years, from 12 to 35 years, from 12 to 30 years; from 12 to 25 years; from 12 to 20 years; from 20 to 40 years; from 20 to 30 years; or from 20 to 25 years; a height of from 1.22 to 1.83 meters, from 1.22 to 1.75 meters; from 1.22 to 1.68 meters; from 1.22 to 1.60 meters; from 1.22 to 1.52 meters; from 1.35 to 1.52 meters, or less than 1.52 meters; an initial weight of from 60 kg to 40 kg; from 57.5 kg to 40 kg; from 55 kg to 40 kg; from 52.5 kg to 40 kg, from 50 kg to 40 kg; from 50 kg to 45 kg; or less than 50 kg; an initial body mass index of from 12 to 45, from 12 to 40, from 12 to 35, from 12 to 30, from 12 to 25; from 15 to 25; from 20 to 25; or less than 25; and an initial hematocrit of from 30% to 50%, from 35% to 45%, from 37.5% to 42.5%; less than 42%, less than 41%, less than 40%, less than 38%, less than 36%, or less than 35%.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has an age of from 12 to 50 years, from 12 to 45 years, from 12 to 40 years, from 12 to 35 years, from 12 to 30 years; from 12 to 25 years; from 12 to 20 years; from 20 to 40 years; from 20 to 30 years; or from 20 to 25 years.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has a height of from 1.22 to 1.83 meters, from 1.22 to 1.75 meters; from 1.22 to 1.68 meters; from 1.22 to 1.60 meters; from 1.22 to 1.52 meters; from 1.35 to 1.52 meters, or less than 1.52 meters.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has an initial weight of from 60 kg to 40 kg; from 57.5 kg to 40 kg; from 55 kg to 40 kg; from 52.5 kg to 40 kg, from 50 kg to 40 kg; from 50 kg to 45 kg, or less than 50 kg.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has an initial body mass index of from 12 to 45, from 12 to 40, from 12 to 35, from 12 to 30, from 12 to 25; from 15 to 25; from 20 to 25, or less than 25.

Disclosed are nutraceutical formulations and methods of using said nutraceutical formulations, for the mitigation of chronic infant malnutrition, said infant breast-feeding from a lactating mother ingesting one or more of said nutraceutical formulations in accordance with a prescribed regimen, wherein the lactating mother has an initial hematocrit of from 30% to 50%, from 35% to 45%, from 37.5% to 42.5%, or less than 42.5%, less than 41%, less than 40%, less than 38%, less than 36%, or less than 35%.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has an age of from 20 to 30 years.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has a height of from 1.35 to 1.52 meters, or less than 1.52.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has an initial weight of from 50 kg to 45 kg, or less than 50 kg.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has an initial body mass index of from 20 to 25, or less than 25.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has an initial hematocrit of from 37.5% to 42.5%, less than 42.5%, less than 40%, or less than 35%.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has the following anthropometric values: an age of from 20 to 30 years; a height of from 1.35 to 1.52 meters; an initial weight of from 50 kg to 45 kg; an initial body mass index of from 20 to 25; and an initial hematocrit of from 37.5% to 42.5%.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother has the following anthropometric values: an age of from 20 to 30 years; a height of less than 1.52 meters; an initial weight of less than 50 kg; an initial body mass index of less than 25; and an initial hematocrit of less than 42.5%.

Disclosed are nutraceutical formulations, and methods of using said nutraceutical formulations, for the mitigation of chronic infant malnutrition, said infant breast feeding from a lactating mother ingesting one or more of said nutraceutical formulations in accordance with a prescribed regimen, wherein the lactating mother is subject to an anemia prevalence of from 15 to 25%.

Further, there are disclosed nutraceutical formulations, and methods of using said nutraceutical formulations, for the mitigation of chronic infant malnutrition, wherein the infant at the start of breast feeding from a lactating mother ingesting one or more of said nutraceutical formulations, had a weight of from 2 kg to 6 kg, from 2.5 kg to 5 kg, from 3 kg to 4 kg, 3.5 kg to 4 kg, less than 4 kg, or less than 3.8 kg; a length of from 35 cm to 60 cm, from 40 cm to 55 cm, from 40 cm to 50 cm, from 45 cm to 55 cm, from 45 cm to 50 cm, less than 55 cm, or less than 52 cm; a cephalic perimeter of from 30 cm to 40 cm, from 32.5 cm to 37.5 cm, 34 cm to 37 cm, from 37 cm to 40 cm, less than 37 cm, or less than 36 cm; and an age of from newborn to 10 days, from newborn to 15 days, from newborn to 30 days, from newborn to 40 days, from newborn to 45 days.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had a weight of from 2 kg to 6 kg, from 2.5 kg to 5 kg, from 3 kg to 4 kg, 3.5 kg to 4 kg, less than 4 kg, or less than 3.8 kg.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had a length of from 35 cm to 60 cm, from 40 cm to 55 cm, from 40 cm to 50 cm, from 45 cm to 55 cm, from 45 cm to 50 cm, less than 55 cm, less than 52 cm, or less than 51 cm.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had a cephalic perimeter of from 30 cm to 40 cm, from 32.5 cm to 37.5 cm, 34 cm to 37 cm, from 37 cm to 40 cm, less than 37 cm, or less than 36 cm.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had an age of from newborn to 10 days, from newborn to 15 days, from newborn to 30 days, from newborn to 40 days, from newborn to 45 days, from 50 days to 60 days, or greater than 60 days.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had a weight of from 3 kg to 4 kg, from 3 kg to 3.8 kg, less than 4 kg, or less than 3.8 kg.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had a length of from 50 cm to 55 cm, from 45 cm to 50 cm, less than 55 cm, less than 52 cm, or less than 51 cm.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had a cephalic perimeter of from 34 cm to 37 cm, less than 37 cm, less than 36 cm, or less than 35 cm.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had an age of from newborn to 40 days.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had a weight of from 3 kg to 4 kg, a length of from 50 cm to 55 cm, a cephalic perimeter of from 34 cm to 37 cm, and an age of from newborn to 40 days.

Disclosed are nutraceutical formulations, and methods of using said nutraceutical formulations, for the mitigation of chronic infant malnutrition, wherein the infant at the start of breast feeding from a lactating mother ingesting one or more of said nutraceutical formulations, had a weight of less than 3.8 kg, a length of less than 51 cm, a cephalic perimeter of less than 35 cm, and an age of from newborn to 40 days.

Disclosed are nutraceutical formulations, and methods of using said nutraceutical formulations, for the mitigation of chronic infant malnutrition, wherein the infant after starting breast feeding from a lactating mother ingesting one or more of said nutraceutical formulations (in accordance with a prescribed daily dosage or ration), showed a monthly weight gain (within 6 to 12 months of age) of from 500 grams to 1000 grams, from 500 grams to 800 grams, from 550 grams to 750 grams, from 500 grams to 700 grams, from 500 to 650 grams, greater than 650 grams, or greater than 700 grams; a monthly gain in length (within 6 to 12 months of age) of from 1 cm to 4 cm, from 1.5 cm to 3.5 cm, from 2 cm to 3 cm, from 2 cm to 2.5 cm, greater than 2 cm, or greater than 2.5 cm; and a monthly gain (within 6 months of age) in cephalic perimeter of from 0.75 cm to 2.0 cm, from 0.75 cm to 1.5 cm, from 1 cm to 1.5 cm, from 1 cm to 1.25 cm, greater than 1 cm, or greater than 1.5 cm. The daily dosage or daily ration, of the one or more nutraceutical formulations disclosed herein that is ingested by the lactating mother, is from 20 grams to 60 grams, from 30 grams to 50 grams, from 35 grams to 45 grams, less than 45 grams, less than 40 grams, or 40 grams.

Disclosed are nutraceutical formulations, and methods of using said nutraceutical formulations, for the mitigation of chronic infant malnutrition, wherein the infant after starting breast feeding from a lactating mother ingesting one or more of said nutraceutical formulations (in accordance with a prescribed daily dosage or ration), showed a monthly weight gain (within 6 to 12 months of age) of from 500 grams to 1000 grams, from 500 grams to 800 grams, from 550 grams to 750 grams, from 500 grams to 700 grams, from 500 to 650 grams, greater than 650 grams, or greater than 700 grams. The daily dosage or daily ration, of the one or more nutraceutical formulations disclosed herein that is ingested by the lactating mother, is from 20 grams to 60 grams, from 30 grams to 50 grams, from 35 grams to 45 grams, less than 45 grams, less than 40 grams, or 40 grams.

Disclosed are nutraceutical formulations, and methods of using said nutraceutical formulations, for the mitigation of chronic infant malnutrition, wherein the infant after starting breast feeding from a lactating mother ingesting one or more of said nutraceutical formulations (in accordance with a prescribed daily dosage or ration), showed a monthly gain in length (within 6 to 12 months of age) of from 1 cm to 4 cm, from 1.5 cm to 3.5 cm, from 2 cm to 3 cm, from 2 cm to 2.5 cm, greater than 2 cm, or greater than 2.5 cm. The daily dosage or daily ration, of the one or more nutraceutical formulations disclosed herein that is ingested by the lactating mother, is from 20 grams to 60 grams, from 30 grams to 50 grams, from 35 grams to 45 grams, less than 45 grams, less than 40 grams, or 40 grams.

Disclosed are nutraceutical formulations, and methods of using said nutraceutical formulations, for the mitigation of chronic infant malnutrition, wherein the infant after starting breast feeding from a lactating mother ingesting one or more of said nutraceutical formulations (in accordance with a prescribed daily dosage or ration), showed a monthly gain (within 6 months of age) in cephalic perimeter of from 0.75 cm to 2.0 cm, from 0.75 cm to 1.5 cm, from 1 cm to 1.5 cm, from 1 cm to 1.25 cm, greater than 1 cm, or greater than 2 cm. The daily dosage or daily ration, of the one or more nutraceutical formulations disclosed herein that is ingested by the lactating mother, is from 20 grams to 60 grams, from 30 grams to 50 grams, from 35 grams to 45 grams, less than 45 grams, less than 40 grams, or 40 grams.

Disclosed are nutraceutical formulations, and methods of using said nutraceutical formulations, for the mitigation of chronic infant malnutrition, wherein the infant after starting breast feeding from a lactating mother ingesting one or more of said nutraceutical formulations (in accordance with a prescribed daily dosage or ration), showed a monthly weight gain (within 6 to 12 months of age) of from 500 grams to 800 grams. The daily dosage or daily ration, of the one or more nutraceutical formulations disclosed herein that is ingested by the lactating mother, is from 35 grams to 45 grams.

Disclosed are nutraceutical formulations, and methods of using said nutraceutical formulations, for the mitigation of chronic infant malnutrition, wherein the infant after starting breast feeding from a lactating mother ingesting one or more of said nutraceutical formulations (in accordance with a prescribed daily dosage or ration), showed a monthly gain in length (within 6 to 12 months of age) of from 1.5 cm to 3 cm. The daily dosage or daily ration, of the one or more nutraceutical formulations disclosed herein that is ingested by the lactating mother, is from 35 grams to 45 grams.

Disclosed are nutraceutical formulations, and methods of using said nutraceutical formulations, for the mitigation of chronic infant malnutrition, wherein the infant after starting breast feeding from a lactating mother ingesting one or more of said nutraceutical formulations (in accordance with a prescribed daily dosage or ration), showed a monthly gain (within 6 months of age) in cephalic perimeter of from 1 cm to 2 cm. The daily dosage or daily ration, of the one or more nutraceutical formulations disclosed herein that is ingested by the lactating mother, is from 20 grams to 60 grams, from 30 grams to 50 grams, from 35 grams to 45 grams, less than 45 grams, less than 40 grams, or 40 grams.

Disclosed are nutraceutical formulations, and methods of using said nutraceutical formulations, for the mitigation of chronic infant malnutrition, wherein the infant after starting breast feeding from a lactating mother ingesting one or more of said nutraceutical formulations (in accordance with a prescribed daily dosage or ration), showed a monthly weight gain (within 6 to 12 months of age) of from 500 grams to 800 grams; a monthly gain in length (within 6 to 12 months of age) of from 2 cm to 3 cm; and a monthly gain (within 6 months of age) in cephalic perimeter of from 1 cm to 2 cm. The daily dosage or daily ration, of the one or more nutraceutical formulations disclosed herein that is ingested by the lactating mother, is from 35 grams to 45 grams.

The nutraceutical formulations of the present disclosure are stabilized rice bran nutraceutical derivatives, FDA-DSHEA compliance for human consumption. The nutraceutical formulations disclosed herein comprise nutraceutical extracts from the hydrophilic (soluble fraction) and lipophilic fractions (fiber fraction) of stabilized rice bran, and resulted, in part, from the combination of hydrophilic (soluble fraction) and lipophilic (fiber fraction) fractions extracted from stabilized rice bran as described in U.S. Pat. No. 8,945,642, which is herein incorporated by reference in its entirety for all that it contains.

In one aspect, the nutraceutical formulations disclosed herein comprising a hydrophilic (soluble fraction)/lipophilic fractions (fiber fraction) blend of from 50% to 60% hydrophilic (soluble fraction)/from 50% to 40% lipophilic fractions (fiber fraction), from 55% to 60% hydrophilic (soluble fraction)/from 45% to 40% lipophilic fractions (fiber fraction), or 57% hydrophilic (soluble fraction)/43% lipophilic fractions (fiber fraction).

Alternatively, the nutraceutical formulations disclosed herein comprise a hydrophilic (soluble fraction)/lipophilic fractions (fiber fraction) blend comprising from 50% to 60%, from 55% to 60%, from 55% to 57%, or 57% of soluble hydrophilic fraction.

Still further, the nutraceutical formulations disclosed herein comprise a hydrophilic (soluble fraction)/lipophilic fractions (fiber fraction) blend comprising from 50% to 40%, from 45% to 40%, from 45% to 43%, or 43% lipophilic fiber fraction.

Still further, the nutraceutical formulations disclosed herein comprise a hydrophilic (soluble fraction)/lipophilic fractions (fiber fraction) ratio of from 1.0 to 1.5, from 1.2 to 1.4, or from 1.2 to 1.3.

The invention claimed is:

1. A method of mitigation of chronic malnutrition in an infant, the method comprising the infant breast feeding from a lactating mother ingesting a nutraceutical comprising a hydrophilic soluble fraction/lipophilic fiber fraction blend, wherein the hydrophilic soluble fraction/lipophilic fiber fraction blend ratio is from 1.2 to 1.4, wherein said lactating mother has an initial body mass index of less than 25, a height of from 1.22 to 1.60 meters, and an age of from 12 to 25 years, and wherein said infant at the start of breast feeding has a weight of from 3 kg to 4 kg and an age of from newborn to 30 days.

2. The method of claim 1, wherein said lactating mother is ingesting from 35 grams per day to 45 grams per day of said nutraceutical.

3. The method of claim 1, wherein said infant showed a monthly weight gain of from 500 grams per month to 800 grams per month in the first 12 months of starting said breast feeding.

* * * * *